(12) United States Patent
Song et al.

(10) Patent No.: US 10,752,504 B2
(45) Date of Patent: Aug. 25, 2020

(54) METHOD FOR PREPARING LITHIUM METAL PHOSPHOR OXIDE

(71) Applicant: Samsung SDI Co., Ltd., Yongin-si, Gyeonggi-do (KR)

(72) Inventors: Hyun A Song, Seoul (KR); Dong Gyu Chang, Daejeon (KR); Woo Young Yang, Daejeon (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 458 days.

(21) Appl. No.: 14/419,289

(22) PCT Filed: May 10, 2013

(86) PCT No.: PCT/KR2013/004162
§ 371 (c)(1),
(2) Date: Feb. 3, 2015

(87) PCT Pub. No.: WO2014/025125
PCT Pub. Date: Feb. 13, 2014

(65) Prior Publication Data
US 2015/0210546 A1 Jul. 30, 2015

(30) Foreign Application Priority Data
Aug. 10, 2012 (KR) .................. 10-2012-0088048

(51) Int. Cl.
*C01B 25/45* (2006.01)
*C01D 15/00* (2006.01)
(Continued)

(52) U.S. Cl.
CPC ............... *C01B 25/45* (2013.01); *B01J 6/00* (2013.01); *B01J 19/24* (2013.01); *C01D 15/00* (2013.01); *C01D 15/02* (2013.01); *C01P 2006/40* (2013.01)

(58) Field of Classification Search
CPC .. C01B 25/45; B01J 6/00; B01J 19/24; C01D 15/00; C01D 15/02; C01P 2006/40
(Continued)

(56) References Cited

U.S. PATENT DOCUMENTS 8,119,285 B2   2/2012   Hatta et al.
8,398,953 B2   3/2013   Park et al.
(Continued)

FOREIGN PATENT DOCUMENTS

CN   101081696 A   12/2007
CN   101567449 A   10/2009
(Continued)

OTHER PUBLICATIONS

Chinese Office Action dated Jul. 18, 2016 in Corresponding Chinese Patent Application No. 201380041775.7.
(Continued)

*Primary Examiner* — William D Young
(74) *Attorney, Agent, or Firm* — Lee IP Law, P.C.

(57) ABSTRACT

The present invention relates to a method for preparing a lithium metal phosphor oxide, the method including: mixing an iron salt solution and a phosphate solution in a reactor; applying a shearing force to the mixed solution in the reactor during the mixing to form a suspension containing nano-sized iron phosphate precipitate particles; obtaining the nano-sized iron phosphate particles from the suspension; and mixing the iron phosphate with a lithium raw material and performing firing, and the lithium metal phosphor oxide according to the present invention has an Equation of $LiM_nFePO_4$. Herein, M is selected from the group consisting of Ni, Co, Mn, Cr, Zr, Nb, Cu, V, Ti, Zn, Al, Ga, and Mg, and n is in a range of 0 to 1. According to the present invention, since calcination is performed at a temperature that is lower than that of another existing method, there is an
(Continued)

effect of reducing a process cost, and the obtained lithium metal phosphor oxide prepared according to the method of the present invention has an olivine structure type.

19 Claims, 13 Drawing Sheets

(51) Int. Cl.
*B01J 6/00* (2006.01)
*B01J 19/24* (2006.01)
*C01D 15/02* (2006.01)

(58) Field of Classification Search
USPC .......................................................... 252/500
See application file for complete search history.

(56) References Cited

U.S. PATENT DOCUMENTS

| | | | |
|---|---|---|---|
| 2009/0186277 A1* | 7/2009 | Beck | H01M 4/5825 429/221 |
| 2010/0102270 A1* | 4/2010 | Jia | C01B 25/37 252/182.1 |
| 2011/0017947 A1 | 1/2011 | Nuspl et al. | |
| 2011/0068295 A1* | 3/2011 | Beck | C01B 25/375 252/182.1 |
| 2011/0114899 A1 | 5/2011 | Xu | |
| 2011/0124493 A1* | 5/2011 | Kuperman | B01J 23/80 502/167 |
| 2011/0133131 A1 | 6/2011 | Zhou et al. | |
| 2012/0141360 A1* | 6/2012 | Park | C01G 23/005 423/598 |
| 2013/0034776 A1 | 2/2013 | Noh et al. | |
| 2013/0071737 A1 | 3/2013 | Belharouak et al. | |

FOREIGN PATENT DOCUMENTS

| | | |
|---|---|---|
| CN | 102859762 A | 1/2013 |
| CN | 102897743 A | 1/2013 |
| EP | 2 562 855 A2 | 2/2013 |
| JP | 2010-040357 A | 2/2010 |
| JP | 2011-082083 A | 4/2011 |
| JP | 2011-181452 A | 9/2011 |
| JP | 2011-213539 A | 10/2011 |
| JP | 2012-036048 A | 2/2012 |
| KR | 1020080017289 A | 2/2008 |
| KR | 10-2008-0100031 A | 11/2008 |
| KR | 10-2010-0117895 A | 11/2010 |
| KR | 10-2010-0139084 A | 12/2010 |
| KR | 10-2011-0016341 A | 2/2011 |
| WO | WO 2005/041327 A1 | 5/2005 |
| WO | 2011/035235 A1 | 3/2011 |

OTHER PUBLICATIONS

International Search Report for corresponding International Application No. PCT/KR2013/004162, dated Aug. 2, 2013 (4 pages).
Final Rejection issued by the Chinese Patent Office dated Jan. 24, 2017 in the examination of the Chinese Patent Application No. 201380041775.7.
Luo, Chuanxi. "Preparation of High Performance Lithium Iron Phosphate by a Novel Precipitation Approach," China University of Technology Master's Thesis (2011). pp. 20-21.
Chinese Office Action dated Oct. 27, 2015 in Corresponding Chinese Patent Application No. 201380041775.7.
Extended European Search Report dated Feb. 26, 2016 in Corresponding European Patent Application No. 13827963.3.
Office Action issued by the Japanese Patent Office dated Jul. 14, 2017 in the examination of the Japanese Patent Application No. 2015-526457.
Notification of Reexamination issued by the Chinese Patent Office dated Dec. 29, 2017 in the examination of the Chinese Patent Application No. 201380041775.7, which corresponds to the subject U.S. Application.
Office Action dated Aug. 31, 2018 in the examination of the Korean Patent Application No. 10-2012-0088048.
Reexamination Decision issued by the Chinese Patent Office dated Jun. 5, 2018 in the examination of the Chinese Patent Application No. 201380041775.7.
European Examination Report issued by the European Patent Office dated Mar. 8, 2018 in the examination of the European Patent Application No. 13 827 963.3.
Office Action issued by the Canadian Patent Office dated Apr. 2, 2019 in the examination of the Canadian Patent Application No. 2878918.
European Office Action dated Nov. 26, 2019.

* cited by examiner

METHOD FOR PREPARING LITHIUM METAL PHOSPHOR OXIDE

TECHNICAL FIELD

The present invention relates to a method for preparing a lithium metal phosphor oxide, and more particularly, to a method for preparing a lithium metal phosphor oxide ($LiMPO_4$, hereinafter, referred to as "LMP") by using an iron phosphate ($FePO_4$, hereinafter, referred to as "FP") or a metal-doped crystalline iron phosphate ($MFePO_4$, hereinafter, referred to as "MFP") as a precursor.

BACKGROUND ART

A lithium metal phosphor oxide (LMP) is a material that is expected to be used as a cathode active material of a lithium secondary battery.

Examples of a method for preparing the LMP include a solid-state reaction and a sol-gel method.

The solid-state reaction is a method for preparing the LMP by mixing solid-state reaction raw materials and performing heat treatment, and has a problem in that since a heat treatment temperature is high and the reaction raw materials having fine particles having a size of several hundreds of nanometers should be used to prepare uniform nano-particles, dependence on the reaction raw materials is increased, and thus price competitiveness is degraded. Further, in the case of the solid-state reaction, since heat treatment itself should be performed in a reduction atmosphere, particular attention is required. Further, a conductive material needs to be applied on a surface of an LMP particle in order to implement a battery property because electric conductivity is low due to a material property of the LMP, and in the case where the solid-state reaction is used, there is a problem in that it is difficult to perform this surface coating.

The sol-gel method is a method for preparing the LMP by preparing metal alkoxide raw materials in a sol state, gelating the metal alkoxide raw materials through a condensation reaction, and then drying and heat treating the gelated metal alkoxide raw materials, and since costs of the used reaction raw materials are high and the sol-gel method is a reaction based on an organic solvent, a preparing cost is high.

Therefore, the present inventors have studied a novel synthesis method capable of solving the aforementioned problems, and found that in the case where the lithium metal phosphor oxide is synthesized by using a crystalline iron phosphate (FP) or a metal-doped crystalline iron phosphate (MFP), which is prepared by applying a high-gravity level of shearing force, as a precursor, a crystalline lithium metal phosphor oxide can be synthesized at a temperature that is even lower than a temperature when an amorphous iron phosphate hydrate is used as a precursor due to structural similarity of the precursor and a product, and growth of particles can be controlled at a low calcination temperature, and thus a process cost can be reduced, thereby accomplishing the present invention.

DISCLOSURE

Technical Problem

The present invention has been made in an effort to provide a method for preparing a lithium metal phosphor oxide (LMP), in which a crystalline lithium metal phosphor oxide (LMP) can be synthesized at a low temperature and growth of particles can be controlled at a low calcination temperature, thereby reducing a process cost.

Technical Solution

An exemplary embodiment of the present invention provides a method for preparing a lithium metal phosphor oxide, including: mixing an iron salt solution and a phosphate solution in a reactor; applying a shearing force to the mixed solution in the reactor during the mixing to form a suspension containing nano-sized iron phosphate precipitate particles; obtaining the iron phosphate particles from the suspension; and mixing the iron phosphate with a lithium raw material and performing firing.

The iron phosphate may be a metal-doped iron phosphate.

The doped iron phosphate may be obtained by doping a dissimilar metal while crystallizing an amorphous iron phosphate, and may have the following Equation:

$$MFePO_4 \qquad \text{Equation I}$$

Herein, M may be selected from the group consisting of Ni, Co, Mn, Cr, Zr, Nb, Cu, V, Ti, Zn, Al, Ga, and Mg.

In Equation I, it is preferable that a molar ratio of [Fe] and [M] be 1-x:x, and herein, x be in a range of 0.01 to 0.05.

Advantageous Effects

In a method for preparing a lithium metal phosphor oxide by using a crystalline iron phosphate or a metal-doped crystalline iron phosphate as a precursor according to the present invention, since calcination is performed at a temperature that is lower than that of another existing method, there is an effect of reducing a process cost.

Further, the obtained lithium metal phosphor oxide prepared according to the method of the present invention makes battery properties and other physical properties excellent when used as a cathode active material for a lithium secondary battery as compared to a lithium metal phosphor oxide prepared by an existing method.

BEST MODE

Figure 1:
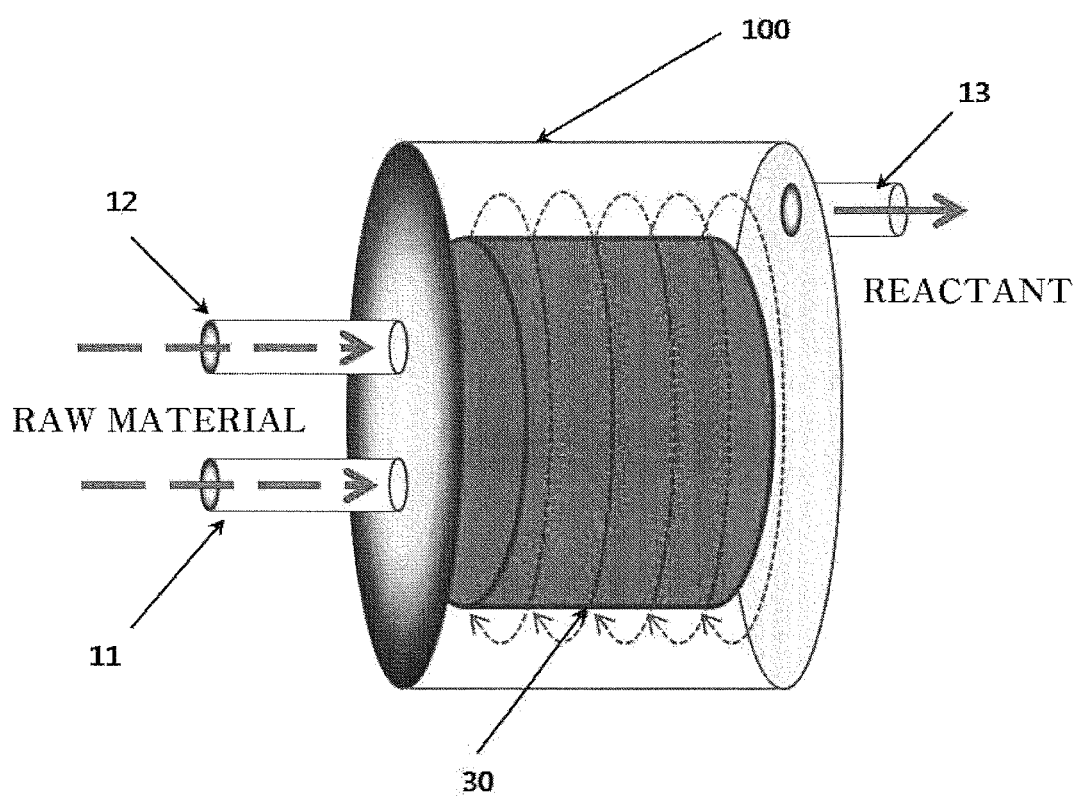
FIG. 1 is a schematic diagram of a reactor for preparing an amorphous or crystalline iron phosphate used to prepare a lithium iron phosphor oxide according to an exemplary embodiment of the present invention.
Figure 2:
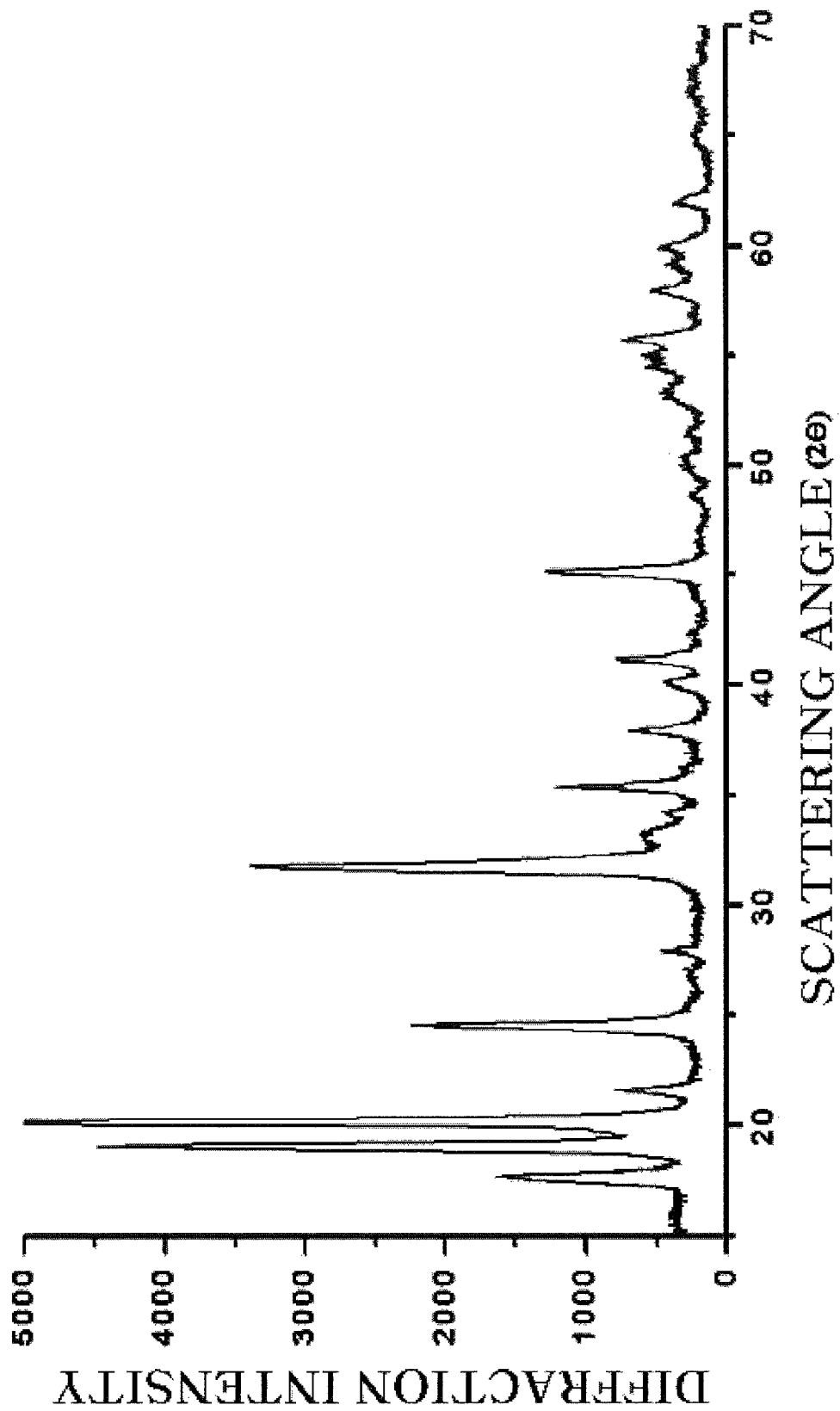
FIG. 2 is a diffraction pattern obtained by observing a crystalline iron (III) phosphate prepared according to the exemplary embodiment of the present invention by an XRD.
Figure 3:
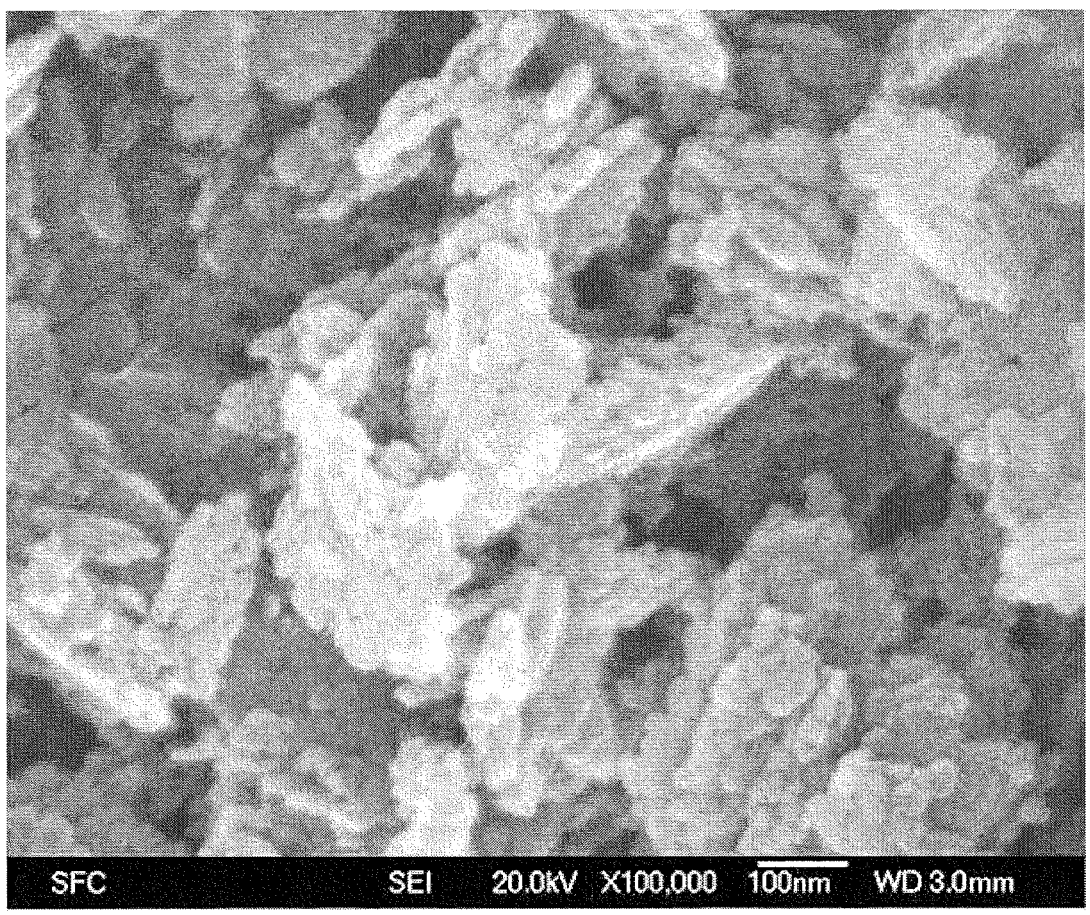
FIG. 3 is an image obtained by photographing the crystalline iron (III) phosphate prepared according to the exemplary embodiment of the present invention by an SEM.

An exemplary embodiment of the present invention may be a method for preparing a lithium metal phosphor oxide having a structure of the following Equation, including mixing an iron salt solution and a phosphate solution in a reactor; applying a shearing force to the mixed solution in the reactor during the mixing to form a suspension containing nano-sized iron phosphate precipitate particles; obtaining the nano-sized iron phosphate particles from the suspension; and mixing the iron phosphate with a lithium raw material and performing firing.

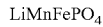  Equation I

Herein, M is selected from the group consisting of Ni, Co, Mn, Cr, Zr, Nb, Cu, V, Ti, Zn, Al, Ga, and Mg, and n is in a range of 0 to 1.

Hereinafter, the present invention will be described in more detail for each step.

Mixing of the iron salt solution and the phosphate solution in the reactor

The iron salt solution means a solution where an iron salt is dissolved in a solvent, and the solvent may be a water solvent, an organic solvent (for example, ethanol), a mixture of the water solvent and the organic solvent, or a mixture of the organic solvents. Anions of the iron salt solution may include one kind or more selected from the group consisting of halides, sulphates, nitrates, and acetates. Non-limiting but specific examples of the anions may include one kind or more selected from the group consisting of $Cl^-$, $Br^-$, $SO_4^{2-}$, $CH_3COO^-$, $NO_3^-$, and $OH^-$.

The iron salt may be a compound including at least one anion and at least one cation. The cation and the anion in the iron salt may be a single ion (monatomic ion) such as $Fe^{2+}$, $Fe^{3+}$, and $Cl^-$, or a complex ion (polyatomic ion) such as $CH_3COO^-$, $NO_3^{2-}$, $SO_4^{2-}$, and $OH^-$. At least one of the cations in the iron salt may be $Fe^{3+}$ or $Fe^{2+}$. The iron salt is not particularly limited as long as the iron salt can be completely or partially dissolved in the selected solvent, but preferably may be selected from an iron acetate salt, an iron halide salt, an iron nitrate salt, an iron sulphate salt, an iron hydroxide salt, and a hydrate and a mixture thereof.

The phosphate solution means a solution where a solute containing $PO_4^{3-}$ is dissolved in the solvent, and if the phosphate solution is added to the iron salt solution, precipitate particles may be formed or grow. The phosphate solution may be prepared by dissolving a solid salt including the phosphate in the solvent, and the solvent may include water, an organic liquid (for example, alcohol), and a mixture thereof. The anion of the phosphate may include one kind or more selected from the group consisting of $HPO_4^{2-}$, $H_2PO_4^-$, $PO_4^{3-}$, and a hydrate and a mixture thereof, but at least one of the anions in the phosphate may be $PO_4^{3-}$.

If the iron salt solution and the phosphate solution are mixed, iron ions of the iron salt solution and phosphate ions of the phosphate solution may be reacted to form the iron phosphate and thus the iron phosphate may be precipitated, and the precipitated iron phosphate particles may be uniformly dispersed in the mixed solution to form the suspension.

In the present exemplary embodiment, mixing of the iron salt solution and the phosphate solution may be performed under a condition where at least one of the nano-sized amorphous iron phosphate particles and the crystalline iron phosphate particles is precipitated. That is, if the iron salt solution and the phosphate solution are mixed, the nano-sized amorphous iron phosphate particles may be precipitated, the nano-sized crystalline iron phosphate particles may be precipitated, or the nano-sized amorphous and crystalline particles may be precipitated together.

In the present exemplary embodiment, mixing of the iron salt solution and the phosphate solution may be performed under a condition where the precipitate containing the iron phosphate is formed. Under the aforementioned condition, the intermediate iron phosphate species may be prevented from being formed. The intermediate iron phosphate species may include metal hydroxide and oxide compounds formed during a precipitation process of the iron salt and a precipitation solution. For example, in the case where a pH value of the precipitation solution is more than 7, hydroxide ions ($OH^-$) may be reacted with iron cations ($Fe^{3+}$, $Fe^{2+}$) of the iron salt (i.e., iron chloride ($FeCl_3$, $FeCl_2$)) in the solution to immediately form the precipitate. The precipitate may not exist in a single iron hydroxide or single iron oxide phase but may exist in a combination of the hydroxide and the oxide. If heat is applied in the sintering or aging step, the intermediate species may be further reacted to form a complete iron oxide crystal, or if air or oxygen is bubbled, the intermediate species may be further reacted to form $Fe_2O_3$ particles. However, it is more preferable that the intermediate species be not formed and the cations ($Fe^{3+}$, $Fe^{2+}$) be directly reacted with the phosphate ions ($PO_4^{3-}$) to form the iron phosphate.

The reactor means a region where the iron salt solution and the phosphate solution are reacted to form the iron phosphate, and will be described in detail in a portion relating to the mixing apparatus at a molecular level and a preparation system.

Applying of the Shearing Force to the Mixed Solution in the Reactor During the Mixing to Form the Suspension Containing the Nano-Sized Iron Phosphate Precipitate Particles Next, the shearing force may be applied to the mixed solution in the reactor during the mixing. If the shearing force is applied to the mixed solution, the precipitated nano-sized iron phosphate particles may have a relatively narrow particle size distribution. Breadth and narrowness of the particle size distribution may be represented by a steepness ratio. The steepness ratio may be defined as a value obtained by dividing a particle average diameter corresponding to 75 mass % by a particle average diameter corresponding to 25 mass %. If the steepness ratio is large, a width of a particle size distribution curve may be large, and if the steepness ratio is small, the width of the particle size distribution curve may be small, and a steeper shape may be exhibited. The particle size distribution may be represented by a SediGraph, and the SediGraph illustrates a cumulative mass percent according to the particle size. The cumulative mass percent means a percent (mass) occupied by a portion where the particle size is the same as or smaller than a special value. An average particle size is a size of a precipitate particle at a point of 50% of the SediGraph. In the present exemplary embodiment, the steepness ratio may be less than 3. Preferably, the steepness ratio may be less than 2, less than 1.9, less than 1.8, less than 1.7, less than 1.6, or less than 1.5, and moreover, the steepness ratio may be less than 1.3.

The shearing force may be generated by agitating the mixed solution in the reactor by an agitator, and a structure and an operation principle of the reactor will be described in detail below. If the shearing force is applied, a fluid flow having a Reynolds number of 2,000 to 200,000, 5,000 to 150,000, or 8,000 to 100,000 may be formed in the reactor. Therefore, materials in the reactor may be mixed well, and an essentially homogeneous mixture may be formed.

The average particle size of the nano-sized amorphous or crystalline iron phosphate precipitate particles formed according to the present exemplary embodiment may be 1 to 100 nm, and preferably 1 to 20 nm, 5 to 30 nm, 5 to 50 nm, 10 to 20 nm, 10 to 50 nm, 20 to 50 nm, 15 to 30 nm, 10 to 100 nm, 10 to 60 nm, or 15 to 20 nm.

In the present exemplary embodiment, the nano-sized iron phosphate precipitate particles may be amorphous.

The present exemplary embodiment may further include aging the suspension under a condition where the crystalline iron phosphate particles are formed. The aging may mean a process of maintaining the suspension of the precipitate particles for a predetermined time under a special condition (temperature, pressure, pH, and agitation speed) so that the precipitate particles essentially have a crystalline structure. The crystalline structure of the precipitate particles may be formed by rapid nucleus generation or partial dissolution and recrystallization of the precipitate particles, and the dissolved particles may be recrystallized over the undissolved particles to form completely crystalline particles or form the larger precipitate particles. Chemical aging may mean a process of adding a chemical material such as an acid or a base to a reaction mixture during the aging process in order to promote the aging process.

The condition where the crystalline iron phosphate particles are formed from the nano-sized amorphous iron phosphate particles may include, for example, the following processes (1), (2), and (3). (1) Slowly increasing a temperature while constantly agitating the suspension to heat the precipitate particle suspension (for example, heating is performed at a constant speed from 25° C. to about 95° C. while the suspension is constantly agitated); (2) maintaining the pH of the suspension in an appropriate range (for example, the pH is about 3 to 5 or 2 to 4) at about 95° C. for about 1 to 5 hours; and (3) cooling the suspension to room temperature (i.e., 25° C.). Herein, in heating (1), a saturation amount of the solvent may be changed, which may reinforce recrystallization or cause an Ostwald ripening phenomenon, and the precipitate particles may grow or be recrystallized to form the particles having the crystal structure or form the particles having the larger size.

Obtaining of the Iron Phosphate Particles from the Suspension

Next, the iron phosphate particles may be obtained from the suspension where the iron phosphate particles float. The iron phosphate particles are obtained through an isolation process, and the isolation may mean a process relating to removing the precipitate particles from a reaction medium. Examples thereof may include filtration, centrifugation, spray drying, freeze drying, another publicly known method of removing a solid from a liquid, or the like. However, the reaction medium may remain on the precipitate particles even after the isolation, and thus the isolation does not essentially mean that the precipitate particles are completely removed from the reaction medium. However, the isolation may include the case where the reaction medium is completely removed from the particles.

In the present exemplary embodiment, the iron salt solution may include one kind or more selected from the group consisting of an iron (II or III) acetate salt, an iron (II or III) halide salt, an iron (II or III) nitrate salt, an iron (II or III) sulfate salt, and a hydrate and a mixture thereof. The formed iron phosphate precipitate particles may include the iron (ferric or ferrous) phosphate, and the iron (ferric or ferrous) phosphate may include one kind or more selected from the group consisting of an amorphous iron (ferric or ferrous) phosphate, a crystalline iron (ferric or ferrous) phosphate, and a hydrate and a mixture thereof.

Meanwhile, the Iron Phosphate May be a Metal-Doped Iron Phosphate.

The doped iron phosphate is obtained by doping a dissimilar metal while crystallizing the amorphous iron phosphate, and has the following Equation:

$$MFePO_4, \hspace{2cm} \text{Equation II}$$

Herein, M may be selected from the group consisting of Ni, Co, Mn, Cr, Zr, Nb, Cu, V, Ti, Zn, Al, Ga, and Mg.

In Equation II, it is preferable that a molar ratio of [Fe] and [M] be 1-x:x, and herein, x be in a range of 0.01 to 0.05.

The metal-doped crystalline iron phosphate of Equation II may be prepared by mixing a dissimilar metal salt with the amorphous iron phosphate and then crystallizing the amorphous iron phosphate mixed with the dissimilar metal salt. The forming of the amorphous iron phosphate may be performed according to a method generally used in the art. For example, the amorphous iron phosphate may be prepared by mixing $FeCl_3$ and $(NH_4)_2HPO_4$ or $NH_4H_2PO_4$ as raw materials in a liquid state and then reacting the raw materials. In this case, the molar ratio of [Fe]:[P] may be in a range of 1:0.9 to 1.1, and it is preferable that a volume ratio of the solid to the solvent be 5 to 15%. In this case, it is preferable that the pH of reactants be adjusted to 4 to 7, and the reactants may be reacted by agitation at a temperature of 25 to 70° C. for 10 to 30 minutes. It is preferable that the reactants be washed two to five times by using a reduced-pressure filter or a centrifuge and then dried.

The mixing of the amorphous iron phosphate with the dissimilar metal is performed before crystallizing the amorphous iron phosphate in order to induce doping of the dissimilar metal. Herein, examples of the metal added to induce doping include Ni, Co, Mn, Cr, Zr, Nb, Cu, V, Ti, Zn, Al, Ga, Mg, and the like, and in this case, the mixing may be performed so that the molar ratio of [Fe] and [M] is 1-x:x, and herein, x is in a range of 0.01 to 0.05. Further, it is preferable that the dissimilar metal salt have the following structure, $MX_3$ (herein, M is selected from the group consisting of Ni, Co, Mn, Cr, Zr, Nb, Cu, V, Ti, Zn, Al, Ga, and Mg, and X is an anion including halogen). Further, the amorphous iron phosphate in a slurry form may be uniformly mixed with a dissimilar metal salt aqueous solution in a liquid phase.

Finally, in the crystallizing of the amorphous iron phosphate mixed with the dissimilar metal salt, crystallization may be performed by heating under a strong acid. Herein, a phosphoric acid or a hydrochloric acid may be added as the strong acid, and heating may be performed while agitation is performed at 90 to 100° C. for 1 to 6 hours. The reaction is finished at a point of time at which colors of the reactants become bright. Likewise, it is preferable that the reactants be washed two to five times by using a reduced-pressure filter or a centrifuge and then dried.

Mixing of the Iron Phosphate with the Lithium Raw Material and Performing Firing The lithium raw material may be selected from the group consisting of LiOH, $Li_2CO_3$, and LiCl, but is not limited thereto. In this case, it is preferable that the iron phosphate and the lithium raw material be mixed so that the molar ratio of [FP]:[Li] is 1:0.5 to 1.5. The crystalline iron phosphate (FP) or the metal-doped crystalline iron phosphate (MFP) and the lithium raw material may be mixed through a method generally used in the art, and for example, mixing and pulverization may be performed by performing dry ball milling or using a mixer. It is preferable that the raw materials be pulverized to have a particle size of about 10 nm to 1 μm.

Meanwhile, in a process of mixing the crystalline iron phosphate or the metal-doped crystalline iron phosphate and the lithium raw material, sucrose, glucose, an ascorbic acid, or an oleic acid may be included as a carbon coating material, but the carbon coating material is not limited thereto. In this case, the carbon coating material may be included in a content of 20 to 40% based on a weight of [Li]. The mixed raw materials may be heat treated at a temperature of 500 to 700° C. In this case, the mixed raw materials may be heat treated under a $H_2/N_2$ mixed gas atmosphere of 1 to 5% for 4 to 12 hours.

Reactor

FIG. 1 is a view schematically illustrating a reactor 100 used in the present invention. Referring to FIG. 1, the reactor 100 may be formed of a chamber surrounding a sealed space. A material of the reactor 100 may be titanium and an alloy thereof. A reaction of the iron salt solution and the phosphate solution may occur in the sealed space. The iron salt solution and the phosphate solution may be supplied through inflow paths 11 and 12 to a distributor (not illustrated) in the reactor 100, and the suspension may flow out through an outflow path 13 from the reactor 100 after the reaction.

The reactor 100 may include an agitator in a form of packed bed 30. The packed bed 30 may essentially have a cylinder shape, may be arranged to form a special structure, and may include a plurality of wire mesh layers having a mesh size of 0.05 mm. The packed bed 30 may have a surface area of 100 to 3,000 $m^2/m^3$. The packed bed 30 may be a scroll mesh type having a cylinder shape, and a portion having the cylinder shape may have a lateral surface formed by a plurality of overlapping mesh layers. The mesh size may be 0.05 to 3 mm or 0.1 to 0.5 mm. Mesh porosity may be at least 90% or 95% or more. The packed bed 30 may have a predetermined structure or may not have a predetermined structure. The packed bed 30 may be a wire mesh type made of a relatively inactive material such as stainless steel, a general metal alloy, a titanium metal, or plastic. The distributor exists at a central portion in a cylinder of the packed bed 30, and the iron salt solution and the phosphate solution may be supplied to the packed bed 30 through the distributor. The distributor spouts the iron salt solution and the phosphate solution to an internal surface of the packed bed 30, and the iron salt solution and the phosphate solution may be mixed and reacted to form a mixture in the packed bed 30 and the reactor 100. The packed bed 30 may be equipped on a vertically positioned rotation shaft. Since the shaft and the packed bed 30 are rotated, a high shearing force of a centrifugal force type may be applied to the mixture in the reactor 100. The size of the centrifugal force applied to the mixture in the packed bed 30 may vary according to rotation speeds of the shaft and the packed bed 30. As the rotation speeds of the shaft and the packed bed 30 are increased, the magnitude of high gravity level or shearing force applied to the mixture may be further increased. The mixture may penetrate the packed bed 30 in a radial direction to move to an external surface of the packed bed 30. The mixture in the packed bed 30 may spread or be split under a high gravity field formed by the centrifugal force to form a thread or a thin film of very fine drops of micrometers to nanometers, and thus actively perform mass transfer and heat transfer between the iron salt solution and the phosphate solution. This may cause strong micro-mixing between the iron salt and the phosphate solution to form a highly uniform-supersaturated solution within a very short time (less than 10 ms). In this process, the nano-sized iron phosphate precipitate may be formed.

Temperatures of the reactor, an iron salt solution supply tank (not illustrated), and a phosphate solution supply tank (not illustrated) may be adjusted by using a heating jacket (not illustrated). The temperatures may be adjusted through a circulation process where a heated fluid flows in through an inlet and flows out through an outlet.

Since the high shearing force may be applied to the liquid in the reactor by rapidly rotating the agitator in the reactor, the sufficiently high gravity level gr ($m/s^2$) may be obtained. Thereby, a micro-mixing requirement may be satisfied within a very short time. The high gravity level may be adjusted by the following Equation:

$$g = (2\pi N/60)^2 \frac{d_{in} + d_{out}}{2}$$

Herein, N is a rotation speed (rpm) of the agitator, $d_{in}$ is an inner diameter of the agitator, and $d_{out}$ is an outer diameter of the agitator. The high gravity level may be 100 to 15,000 $m/s^2$, 500 to 2,000 $m/s^2$, 1,000 to 5,000 $m/s^2$, or 800 to 5,000 $m/s^2$. Since the agitator at the strong high gravity level is used, the liquids in the reactor may receive the strong shearing force as soon as the liquids are injected into the reactor.

When the agitator is rotated in the reactor, the iron salt solution and the phosphate solution may be injected into a space formed by vortexing. An injection speed may be at least 1 m/s, at least 2 m/s, at least 3 m/s, at least 4 m/s, or at least 5 m/s.

The reactor may be operated in a turbulent flow state. The two solutions may be more rapidly mixed due to a turbulent flow. A spout flux may be preferably 0.1 to 3,000 $m^3$/hr and more preferably 0.1 to 800 $m^3$/hr. A spout pressure may be preferably 30 to 3,000 $kg/cm^2$ and more preferably 50 to 1,000 kg/cm². A Reynolds number (Re) may be preferably 2,000 to 200,000 and more preferably 8,000 to 100,000. In the case where the Reynolds number is in the aforementioned range, since chemical homogeneity at a molecular level may be obtained before nucleus generation in the reactor, high super-saturation may be obtained within a short time, and thus many nuclei may be generated in a first step of precipitation to prepare fine precipitate particles having a uniform particle size distribution. Further, since chemical homogeneity at the molecular level in the reactor may be obtained within a very short time, when the iron phosphate is synthesized, formation of large intermediate agglomerates and formation of the intermediate species such as iron hydroxides, hydrous ferric oxides, and ferrous oxides or amorphous ferric oxyhydroxides may be prevented, and thus the precipitate may be mostly formed of the iron phosphate.

The Reynolds number may be adjusted based on the following Equation.

$$Re = \frac{d \cdot u \cdot \rho}{\mu}$$

Herein, d is a diameter of a pipe (or distributor) through which a reaction solution is supplied to a mixing apparatus at a molecular level, u is a flow rate of a liquid, $\rho$ is a density of the liquid, and $\mu$ is a viscosity of the liquid.

A relationship among the diameter of the distributor, the flow rate, and a flux is the same as the following Equation:

$$Q = \frac{\pi \cdot d^2 \cdot u}{4}$$

Herein, Q is the flux.

If the diameter of the distributor is determined, the flow rate is determined by the flux. A pressure is required to maintain a spout flux. The diameter of the distributor, the flux, the pressure, and the Reynolds number are connected with each other.

Various Aspects of the Present Invention

The present invention may be implemented in the following various aspects.

(First Aspect)

A method for preparing a lithium metal phosphor oxide, including:

mixing an iron salt solution and a phosphate solution in a reactor;

applying a shearing force to the mixed solution in the reactor during the mixing to form a suspension containing nano-sized amorphous iron phosphate particles;

obtaining the nano-sized amorphous iron phosphate particles from the suspension;

aging the nano-sized amorphous iron phosphate particles to form nano-sized crystalline iron phosphate particles; and mixing the nano-sized crystalline iron phosphate with a lithium raw material and performing firing.

(Second Aspect)

A method for preparing a lithium metal phosphor oxide, including:

mixing an iron salt solution and a phosphate solution in a reactor;

applying a shearing force to the mixed solution in the reactor during the mixing to form a suspension containing nano-sized amorphous iron phosphate particles;

obtaining the nano-sized amorphous iron phosphate particles from the suspension;

aging the nano-sized amorphous iron phosphate particles to form nano-sized crystalline iron phosphate particles;

applying the shearing force to a mixture containing the nano-sized amorphous iron phosphate particles during the aging to form the nano-sized crystalline iron phosphate particles; and mixing the nano-sized crystalline iron phosphate with a lithium raw material and performing firing.

(Third Aspect)

A method for preparing a lithium metal phosphor oxide, including:

mixing an iron salt solution and a phosphate solution in a reactor;

applying a shearing force to the mixed solution in the reactor during the mixing to form a suspension containing nano-sized amorphous iron phosphate particles;

obtaining the nano-sized amorphous iron phosphate particles from the suspension;

aging the nano-sized amorphous iron phosphate particles to form a mixture containing nano-sized crystalline iron phosphate particles;

applying the shearing force to a mixture containing the nano-sized amorphous iron phosphate particles during the aging to form the nano-sized crystalline iron phosphate particles;

isolating the crystalline iron phosphate particles from the mixture containing the nano-sized crystalline iron phosphate particles and performing drying to obtain the crystalline iron phosphate particles; and mixing the nano-sized crystalline iron phosphate with a lithium raw material and performing firing.

EXAMPLES AND COMPARATIVE EXAMPLES

Hereinafter, the present invention will be described in more detail by the Examples, but the present invention is not limited by the following Examples. The nano-sized iron phosphate particles were prepared by using the system illustrated in FIG. 1.

Example 1

Synthesis of Amorphous Iron (III) Phosphate (Ferric Phosphate) ($FePO_4 \cdot 2H_2O$)

Iron chloride (ferric chloride) was dissolved in distilled water to prepare 2.52 l of the iron chloride solution having the concentration of 0.32 mol/l. Diammonium phosphate was dissolved in distilled water to prepare 2.52 l of the diammonium phosphate solution having the concentration of 0.32 mol/l. The iron and phosphate solutions were simultaneously pumped through the distributor at the flow rate of 0.4 l/min into the reactor 100 of the mixing apparatus at a molecular level. The reactants were maintained at room temperature (25° C.) during the mixing and reaction steps. In this case, the high gravity level of the packed bed 30 was set to 1579 m/s², and the injection speeds of the two solutions were set to 5 m/s. The retention time in the mixing apparatus at a molecular level was set to 20 s. The suspension where the yellow precipitate floated was collected in the product tank, the ammonium hydroxide solution (5.82 wt %) was added thereto, and agitation was performed under atmospheric condition for 15 minutes. After isolation and washing through the centrifuge method, drying was performed at 70° C. for 16 hours to prepare the amorphous iron (ferric) phosphate nano-particles. According to the XRD pattern and SEM analysis result of the sample prepared according to the present Example, the particles were spherical amorphous iron (ferric) phosphate nano-particles, the average particle size was 15 nm, and the steepness ratio was 1.42.

Synthesis of Crystalline Iron (III) Phosphate (Crystalline Ferric Phosphate) ($FePO_4.2H_2O$)

The amorphous iron (ferric) phosphate particles were dispersed in water to prepare the amorphous iron (ferric) phosphate suspension having the pH of 3.7. The temperature of the slurry suspension in the tank was changed from 25° C. to 95° C. The phosphoric acid (85%) was added to maintain the pH value at 2.41. The tank was intensely agitated to promote heat transfer and prevent precipitation of the particles while the temperature was changed. After treatment at 95° C. for 90 minutes, the color of the yellow suspension was changed to white. The white iron phosphate particles were subjected to centrifugation and washed so that the pH value of the supernatant was 3.27. After the cake subjected to centrifugation was dried at 70° C. for 16 hours, 146 g of the dried powder was obtained. According to the scanning electron microscope image, it can be confirmed that the average particle size is 43 nm and the particle has the incomplete egg shape. According to the particle size distribution, the steepness ratio (D75/D25) is 1.35. According to the XRD pattern, it can be confirmed that the particles have the meta-strengite I phase. As the element analysis result, according to the inductively coupled plasma-optical emission spectroscopy (ICP-OES), Fe was 28.5 wt % and P was 17.5 wt %, and according to the ion chromatography (IC) (detection limitation=50 ppm), $Cl^-$ was not detected.

Synthesis of Lithium Iron Phosphor Oxide

The crystalline iron phosphate was subjected to mortar treatment together with LiOH and sucrose to be mixed and pulverized. In this case, the crystalline iron phosphate and LiOH were mixed so that the molar ratio of [FP]:[Li] was 1:1, and mixing was performed so that the ratio of sucrose was 30% based on the weight of [Li]. The mixed powders were heat treated under the 3% $H_2/N_2$ mixed gas atmosphere at the temperature of 650° C. for 10 hours to synthesize the lithium iron phosphor oxide.

Example 2

Synthesis of Crystalline Iron (III) Phosphate (Ferric Phosphate) ($FePO_4.2H_2O$)

The iron (ferric) phosphate particles were prepared by the same method as Example 1, except that 6.36 g of the phosphoric acid (85%) was added to the yellow suspension and heat treatment was performed at 80° C. for 90 minutes. In the iron (ferric) phosphate particles, the average particle size is 28.7 nm and the steepness ratio is 1.47. According to the XRD diffraction pattern, it can be confirmed that crystallization is performed in the meta-strengite I phase to form the iron (ferric) phosphate.

Synthesis of Lithium Iron Phosphor Oxide

The crystalline iron phosphate was mixed together with LiOH and sucrose, and subjected to dry ball milling for 16 hours. In this case, the crystalline iron phosphate and LiOH were mixed so that the molar ratio of [FP]:[Li] was 1:1, and mixing was performed so that the ratio of sucrose was 30% based on the weight of [Li]. The mixed powders were heat treated under the 3% $H_2/N_2$ mixed gas atmosphere at the temperature of 660° C. for 8 hours to synthesize the lithium iron phosphor oxide.

Example 3

Synthesis of Crystalline Iron (III) Phosphate (Ferric Phosphate) ($FePO_4.2H_2O$)

The crystalline iron (ferric) phosphate particles were prepared by the same method as Example 1, except that 75 ml of the $(NH_3)_2HPO_4$ solution having the concentration of 0.32 mol/l and 8.75 g of the ammonium hydroxide solution (5.82 wt % as $NH_3$) were previously mixed and filtered to be stored in the tank. In the iron (ferric) phosphate particles, the average particle size is 33.4 nm and the steepness ratio is 1.39. According to the XRD diffraction pattern, it can be confirmed that crystallization is performed in the meta-strengite I phase to form the iron (ferric) phosphate.

Synthesis of Lithium Iron Phosphor Oxide

The crystalline iron phosphate was mixed together with the lithium carbonate and the oleic acid, and pulverized in the mixer for home use for 20 minutes. In this case, the crystalline iron phosphate and the lithium carbonate were mixed so that the molar ratio of [FP]:[Li] was 1:1, and mixing was performed so that the ratio of the oleic acid was 30% based on the weight of [Li]. The mixed powders were heat treated under the 3% $H_2/N_2$ mixed gas atmosphere at the temperature of 650° C. for 8 hours to synthesize the lithium iron phosphor oxide.

Example 4

Synthesis of Crystalline Iron (III) Phosphate (Ferric Phosphate) ($FePO_4.2H_2O$)

The crystalline iron (ferric) phosphate particles were prepared by the same method as Example 1, except that 75 ml of the $H_3PO_4$ solution having the concentration of 3 wt % and 7.7 g of the ammonium hydroxide solution (25 wt % as $NH_3$) were previously mixed and filtered to be stored in the tank.

In the iron (ferric) phosphate particles, the average particle size is 38.7 nm and the steepness ratio is 1.42. The XRD diffraction pattern exhibits that crystallization is performed in the meta-strengite I phase to form the iron (ferric) phosphate.

Synthesis of Lithium Iron Phosphor Oxide

The lithium iron phosphor oxide was synthesized by the same method as Example 1.

Example 5

Synthesis of Crystalline Iron (III) Phosphate (Ferric Phosphate) ($FePO_4.2H_2O$)

The crystalline iron (ferric) phosphate particles were prepared by the same method as Example 1, except that the ammonia gas was bubbled in 75 ml of the $H_3PO_4$ solution having the concentration of 3 wt % to prepare the mixed solution having the pH of 9.87. The mixed solution was previously filtered to be stored in the tank. In the iron (ferric) phosphate particles, the average particle size is 35.9 nm and the steepness ratio is 1.46. According to the XRD diffraction pattern, it can be confirmed that crystallization is performed in the meta-strengite I phase to form the iron (ferric) phosphate.

Synthesis of Lithium Iron Phosphor Oxide

The lithium iron phosphor oxide was synthesized by the same method as Example 1.

Example 6

Synthesis of Iron (II) Phosphate (Ferrous Phosphate) ($Fe_3(PO_4)_2.8H_2O$)

The ammonium iron (II) sulfate ($Fe(NH_4)_2(SO_4)_2.7H_2O$) aqueous solution was put into the iron salt solution tank, and the dipotassium phosphate ($K_2HPO_4$) aqueous solution was put into another tank to be agitated. In this case, the molar ratio of the raw material was set so that the ratio of [Fe]:[P] was 3:2, and the ratio of the solid to the solvent was 25%. The solutions were simultaneously injected into the reactor so that the pump speed was 0.4 l/min and the injection speed was 5 m/s, and the temperatures of the tank and the reactor were room temperature (25° C.). In this case, the high gravity level of the packed bed was 1,579 m/s$^2$, and the retention time in the mixing apparatus at a molecular level was set to 20 seconds. After injection of the raw material was finished, the saturated ammonium hydroxide (NH$_4$OH) aqueous solution was added to set the pH to 6.5. Subsequently, after the temperature of the reactor was set to 70° C., additional operation was performed for 15 minutes. The resulting reaction slurry was washed three times by using the reduced-pressure filter. The washed cake was dried in the oven at 90° C. to synthesize the iron (II) phosphate. According to the XRD diffraction pattern, it can be confirmed that crystallization is performed in a vivianite phase to form the iron (ferrous) phosphate.

Synthesis of Lithium Iron Phosphate (LiFePO$_4$)

The crystalline iron (II) phosphate (Fe$_3$(PO$_4$)$_2$.8H$_2$O) was subjected to mortar treatment together with the lithium phosphate (Li$_3$PO$_4$) and sucrose to be mixed and pulverized. In this case, the raw materials were mixed so that the molar ratio was 1:1, and mixing was performed so that the ratio of sucrose was 40% based on the weight of the lithium phosphate. The mixed powders were heat treated under the 3% H$_2$/N$_2$ mixed gas atmosphere at the temperature of 670° C. for 8 hours to synthesize the lithium iron phosphor oxide.

Example 7

Synthesis of Iron (II) Phosphate (Ferrous Phosphate) (Fe$_3$(PO$_4$)$_2$.8H$_2$O)

Preparation was performed by the same method as Example 7.

Synthesis of Lithium Iron Phosphate (LiFePO$_4$)

The crystalline iron (II) phosphate (Fe$_3$(PO$_4$)$_2$.8H$_2$O) was mixed with the lithium carbonate (Li$_2$CO$_3$), the diammonium phosphate (NH$_4$HPO$_4$), and glucose, pure water was added so that the ratio was 30% based on the solid, and beads milling was performed for 1 hour. In this case, the raw materials were mixed so that the molar ratio of iron (II) phosphate:lithium carbonate:diammonium phosphate was 2:3:2, and mixing was performed so that the ratio of glucose was 40% based on the weight of the lithium carbonate. The mixed slurry was dried by the spray-type drier, and then heat treated under the 3% H$_2$/N$_2$ mixed gas atmosphere at the temperature of 680° C. for 10 hours to synthesize the lithium iron phosphor oxide.

Example 8

Synthesis of Iron (II) Phosphate (Ferrous Phosphate) (Fe$_3$(PO$_4$)$_2$.8H$_2$O)

Preparation was performed by the same method as Example 7.

Synthesis of Lithium Iron Phosphate (LiFePO$_4$)

The crystalline iron (II) phosphate (Fe$_3$(PO$_4$)$_2$.8H$_2$O) was mixed with the lithium hydroxide (LiOH.H$_2$O), the diammonium phosphate (NH$_4$HPO$_4$), and the oleic acid, and subjected to dry ball milling for 16 hours. In this case, the raw materials were mixed so that the molar ratio of iron (II) phosphate:lithium hydroxide:diammonium phosphate was 1:3:1, and mixing was performed so that the ratio of the oleic acid was 30% based on the weight of the lithium hydroxide. The mixed powders were heat treated under the 3% H$_2$/N$_2$ mixed gas atmosphere at the temperature of 650° C. for 8 hours to synthesize the lithium iron phosphor oxide.

Example 9

Synthesis of Chrome-Doped Crystalline Iron Phosphate

The amorphous iron phosphate hydrate and chrome trichloride (CrCl$_3$) obtained in Example 1 were taken so that the molar ratio of [Fe]:[Cr] was 1-x:x and x is 0.02, pure water was put, and mixing was performed to form the slurry. In this case, the volume ratio of the solid to the solvent was 10%. The temperature of the slurry suspension in the tank was changed from 25° C. to 95° C. The phosphoric acid (H$_3$PO$_4$) was added to the slurry to adjust the pH to 2 to 3. The tank was intensely agitated to promote heat transfer and prevent precipitation of the particles while the temperature was changed. After treatment at 95° C. for 90 minutes, the color of the yellow suspension was changed to white. The white iron phosphate particles were subjected to centrifugation and washed.

Synthesis of Lithium Chrome Iron Phosphor Oxide

The chrome-doped crystalline iron phosphate was mixed together with LiOH and sucrose, and subjected to dry ball milling for 16 hours. In this case, the chrome-doped crystalline iron phosphate and LiOH were mixed so that the molar ratio was 1:1, and mixing was performed so that the ratio of sucrose was 30% based on the weight of [Li]. The mixed powders were heat treated under the 3% H$_2$/N$_2$ mixed gas atmosphere at the temperature of 660° C. for 8 hours to synthesize the lithium chrome iron phosphor oxide.

Example 10

Synthesis of Aluminum-Doped Crystalline Iron Phosphate

The amorphous iron phosphate and aluminum trichloride (AlCl$_3$) obtained in Example 1 were taken so that the molar ratio of [Fe]:[Al] was 1-x:x and x is 0.02, pure water was put, and mixing was performed to form the slurry. In this case, the volume ratio of the solid to the solvent was 10%. The temperature of the slurry suspension in the tank was changed from 25° C. to 95° C. The phosphoric acid (H$_3$PO$_4$) was added to the slurry to adjust the pH to 2 to 3. The tank was intensely agitated to promote heat transfer and prevent precipitation of the particles while the temperature was changed. After treatment at 95° C. for 90 minutes, the color of the yellow suspension was changed to white. The white iron phosphate particles were subjected to centrifugation and washed.

Synthesis of Lithium Aluminum Iron Phosphor Oxide

The prepared aluminum-doped crystalline iron phosphate was subjected to mortar treatment together with the lithium carbonate and glucose to be mixed and pulverized. In this case, the aluminum-doped crystalline iron phosphate and the lithium carbonate were mixed so that the molar ratio was 1:1, and mixing was performed so that the ratio of glucose was 30% based on the weight of [Li]. The mixed powders were heat treated under the 3% H$_2$/N$_2$ mixed gas atmosphere at the temperature of 650° C. for 10 hours to synthesize the lithium aluminum iron phosphor oxide.

Comparative Example 1

Li$_2$CO$_3$, FeC$_2$O$_4$, (NH$_4$)$_2$HPO$_4$, and sucrose were put into water and subjected to ball milling for 16 hours. In this case, in addition to water, acetone, ethanol, and isopropanol may be used as the solvent. When $Li_2CO_3$, $FeC_2O_4$, and $(NH_4)_2HPO_4$ were mixed, mixing was performed so that the molar ratio of [Li]:[Fe]:[P] was 1:1:1, and mixing was performed so that the ratio of sucrose was 30% based on the weight of [Li]. In this case, the volume ratio of the solid to the solvent was 30%. The mixture was heat treated under the 3% $H_2/N_2$ reduction gas atmosphere at 750° C. for 8 hours to synthesize the lithium iron phosphor oxide.

Comparative Example 2

The amorphous iron phosphate hydrate (amorphous $FePO_4.2H_2O$) was mixed with LiOH and sucrose, and subjected to dry ball milling for 16 hours. In this case, when the amorphous iron phosphate hydrate and LiOH were mixed, mixing was performed so that the molar ratio of [FP]:[Li] was 1:1, and mixing was performed so that the ratio of sucrose was 30% based on the weight of [Li]. The mixture was heat treated under the 3% $H_2/N_2$ reduction gas atmosphere at 800° C. for 8 hours to synthesize the lithium iron phosphor oxide.

Analysis Example

Figure 4:
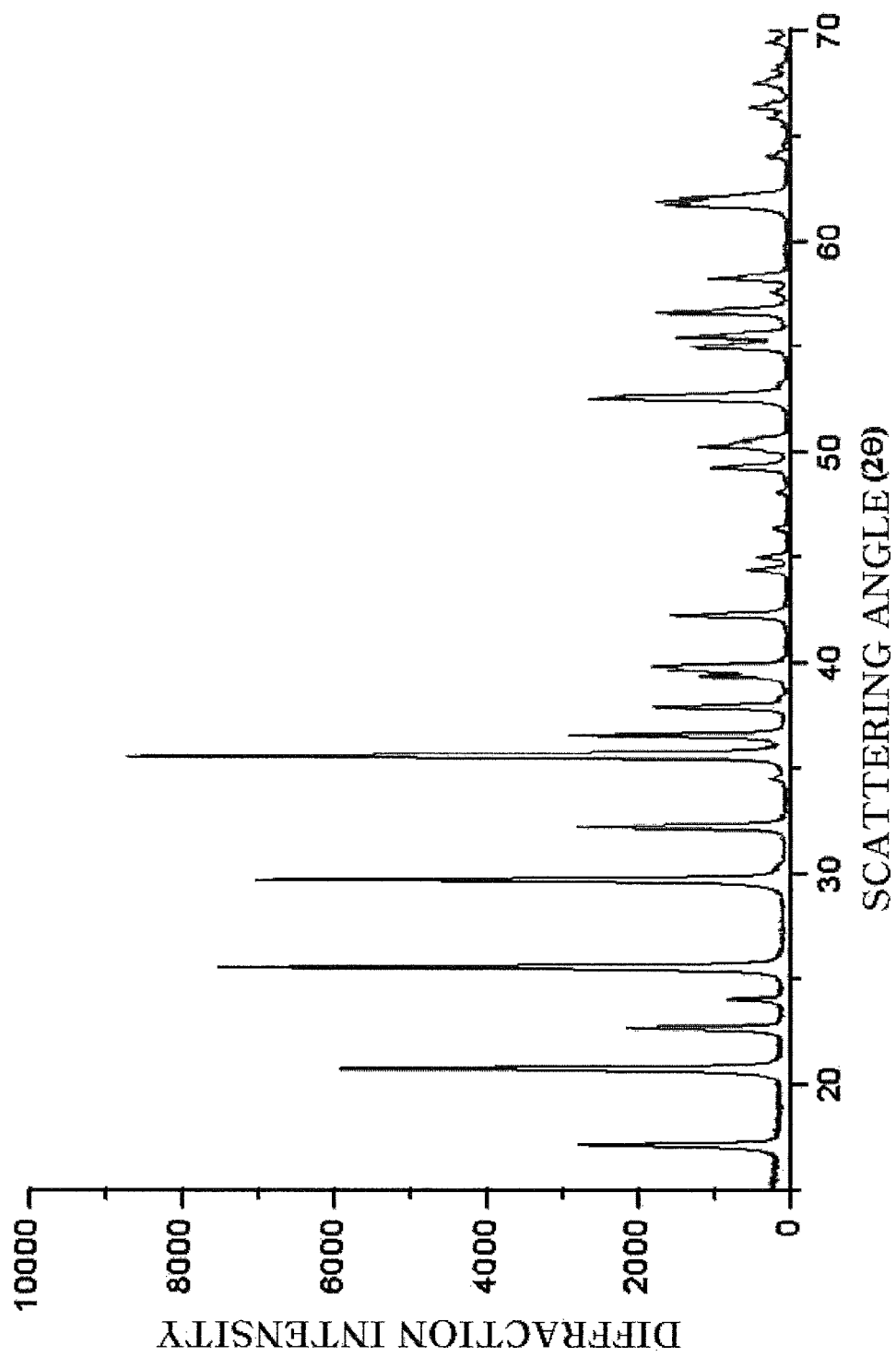
FIG. 4 is a diffraction pattern obtained by observing a lithium iron phosphor oxide prepared from the crystalline iron (III) phosphate according to the exemplary embodiment of the present invention by the XRD.
Figure 5:
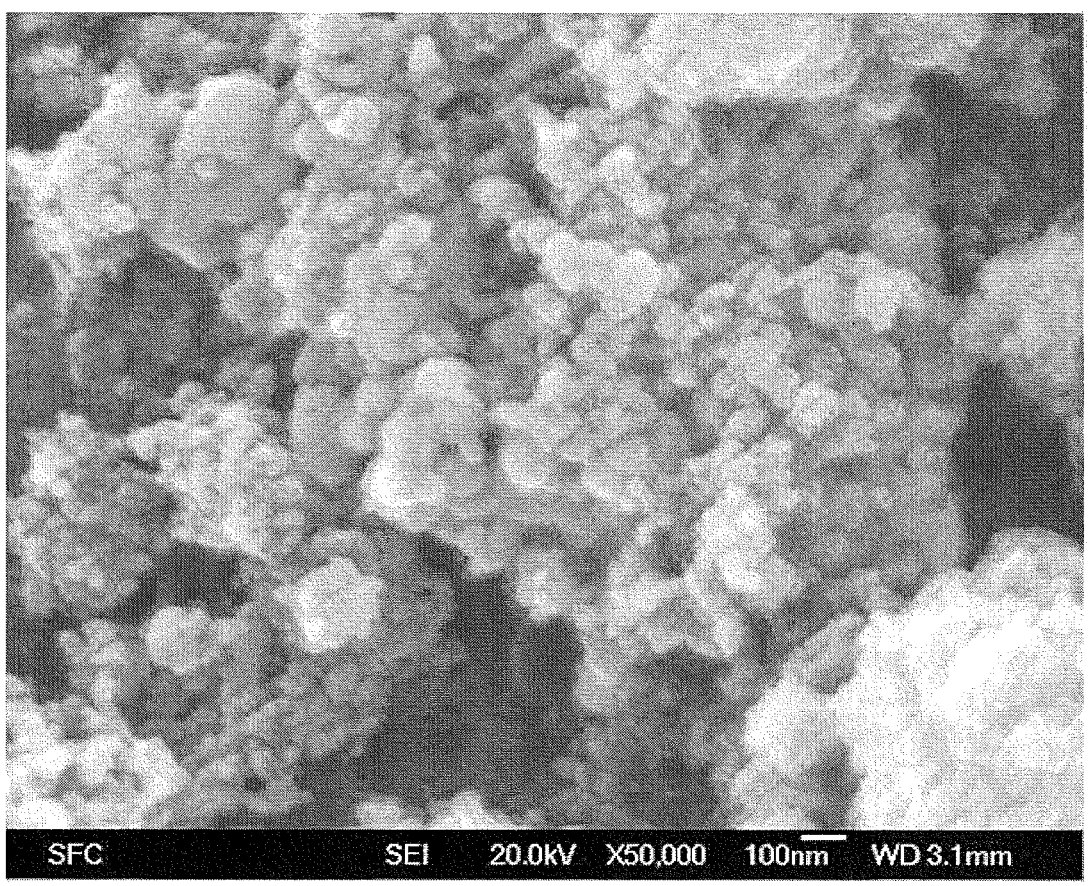
FIG. 5 is an image obtained by photographing the lithium iron phosphor oxide prepared from the crystalline iron (III) phosphate according to the exemplary embodiment of the present invention by the SEM.
Figure 6:
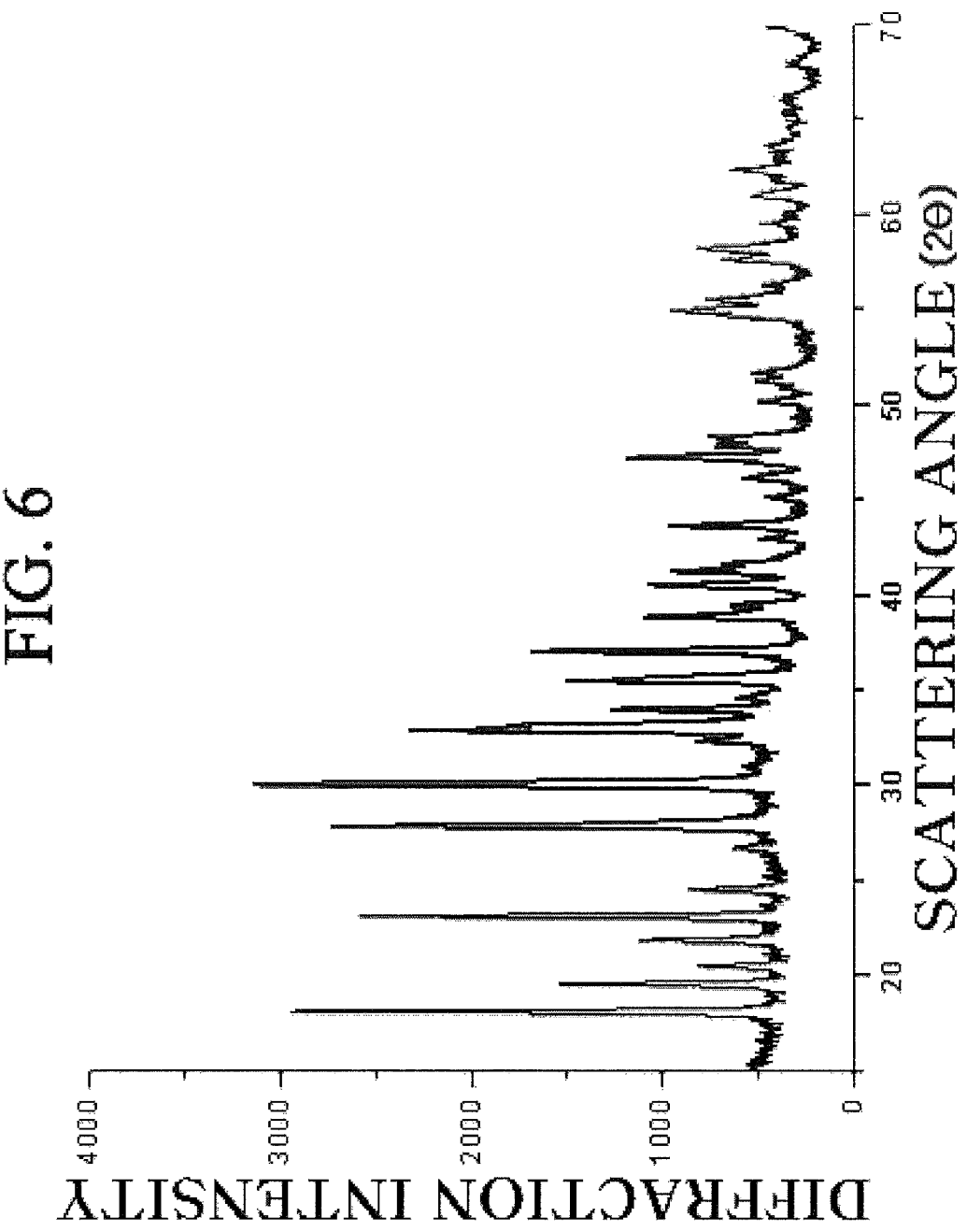
FIG. 6 is a diffraction pattern obtained by observing a crystalline iron (II) phosphate prepared according to the exemplary embodiment of the present invention by the XRD.
Figure 7:
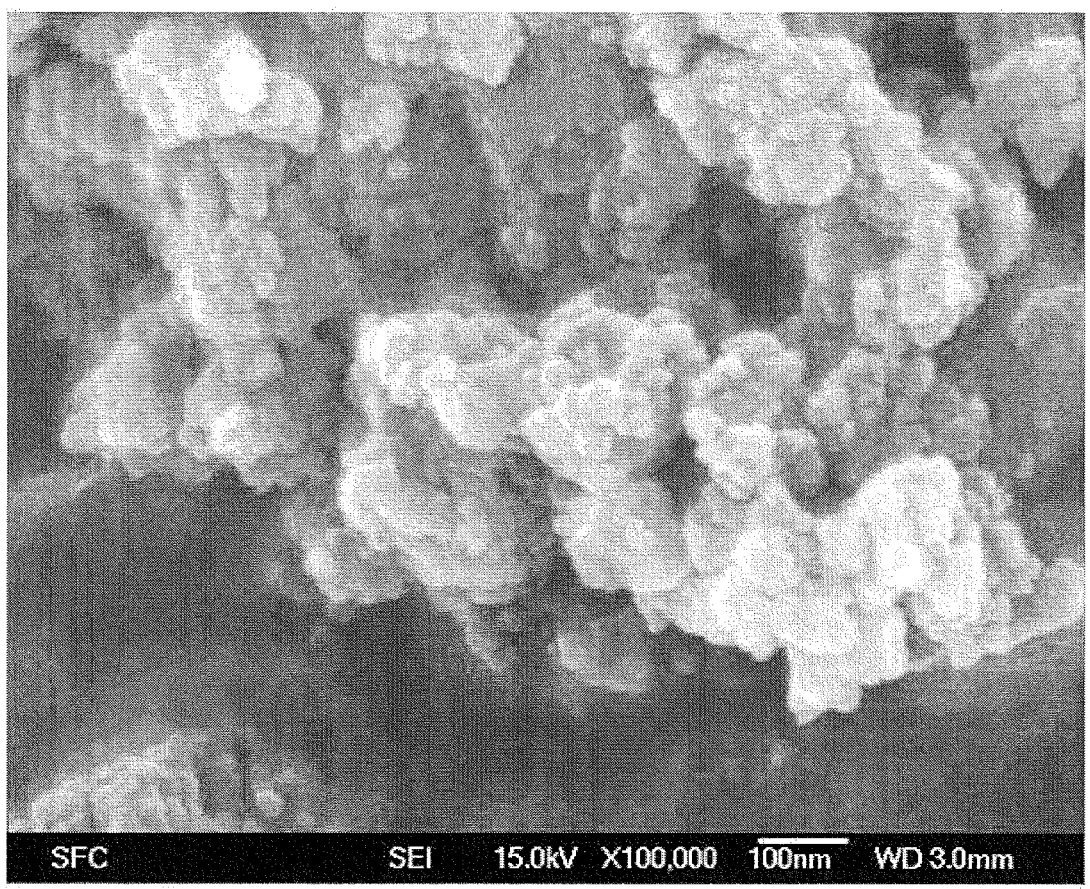
FIG. 7 is an image obtained by photographing the crystalline iron (II) phosphate prepared according to the exemplary embodiment of the present invention by the SEM.
Figure 8:
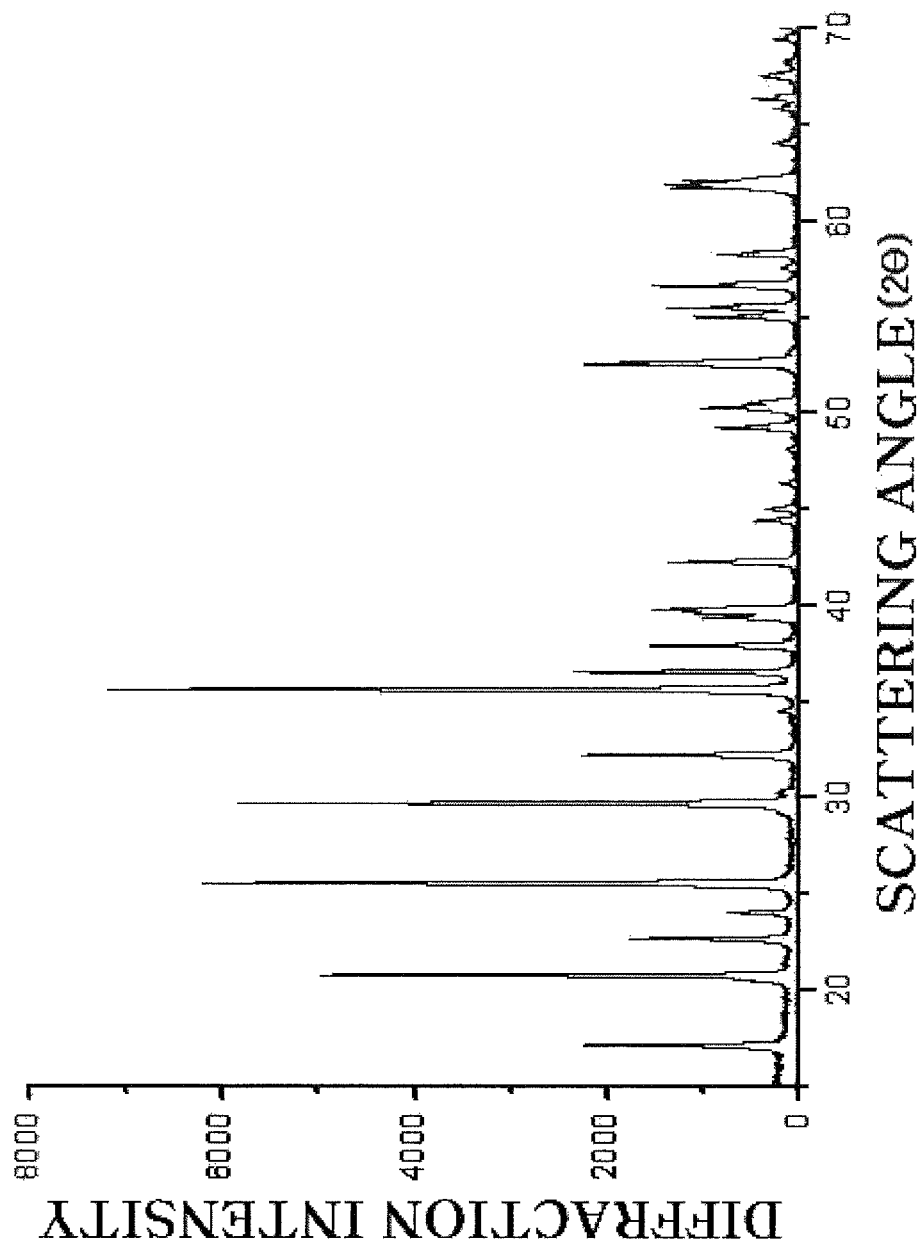
FIG. 8 is a diffraction pattern obtained by observing a lithium iron phosphor oxide prepared from the crystalline iron (II) phosphate according to the exemplary embodiment of the present invention by the XRD.
Figure 9:
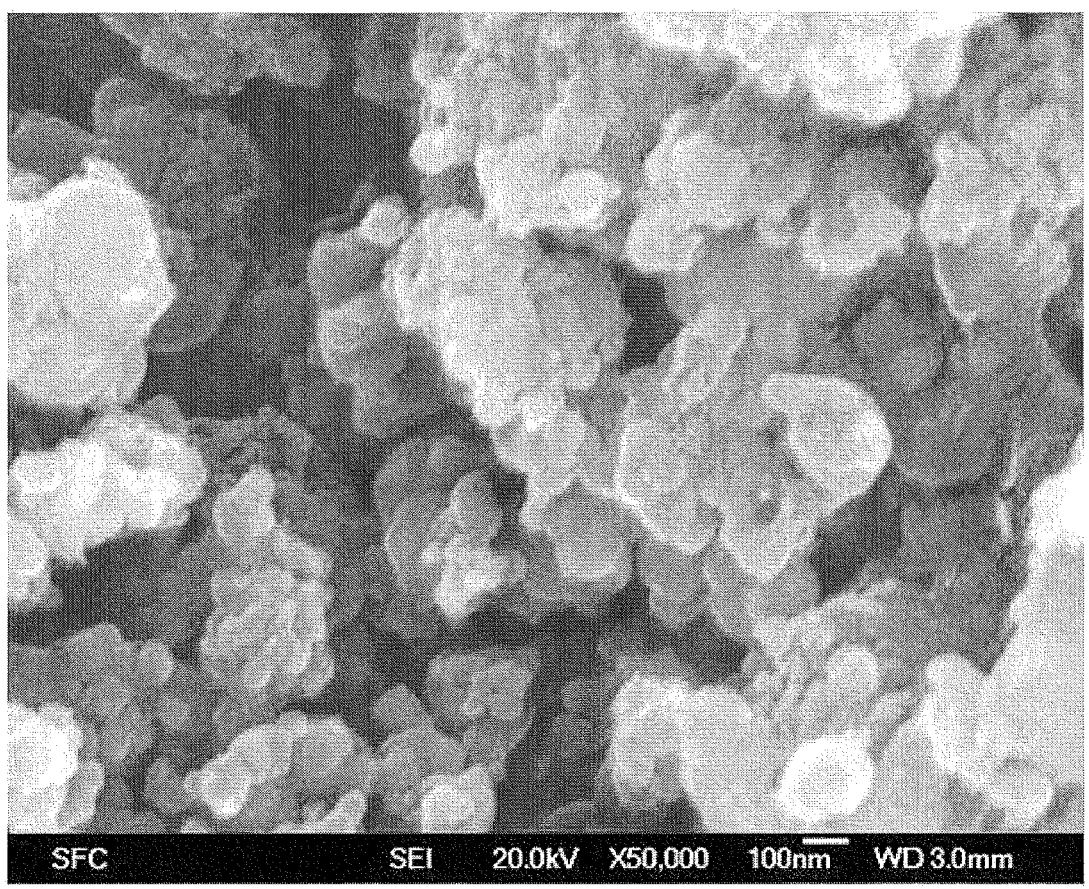
FIG. 9 is an image obtained by photographing the lithium iron phosphor oxide prepared from the crystalline iron (II) phosphate according to the exemplary embodiment of the present invention by the SEM.
Figure 10:
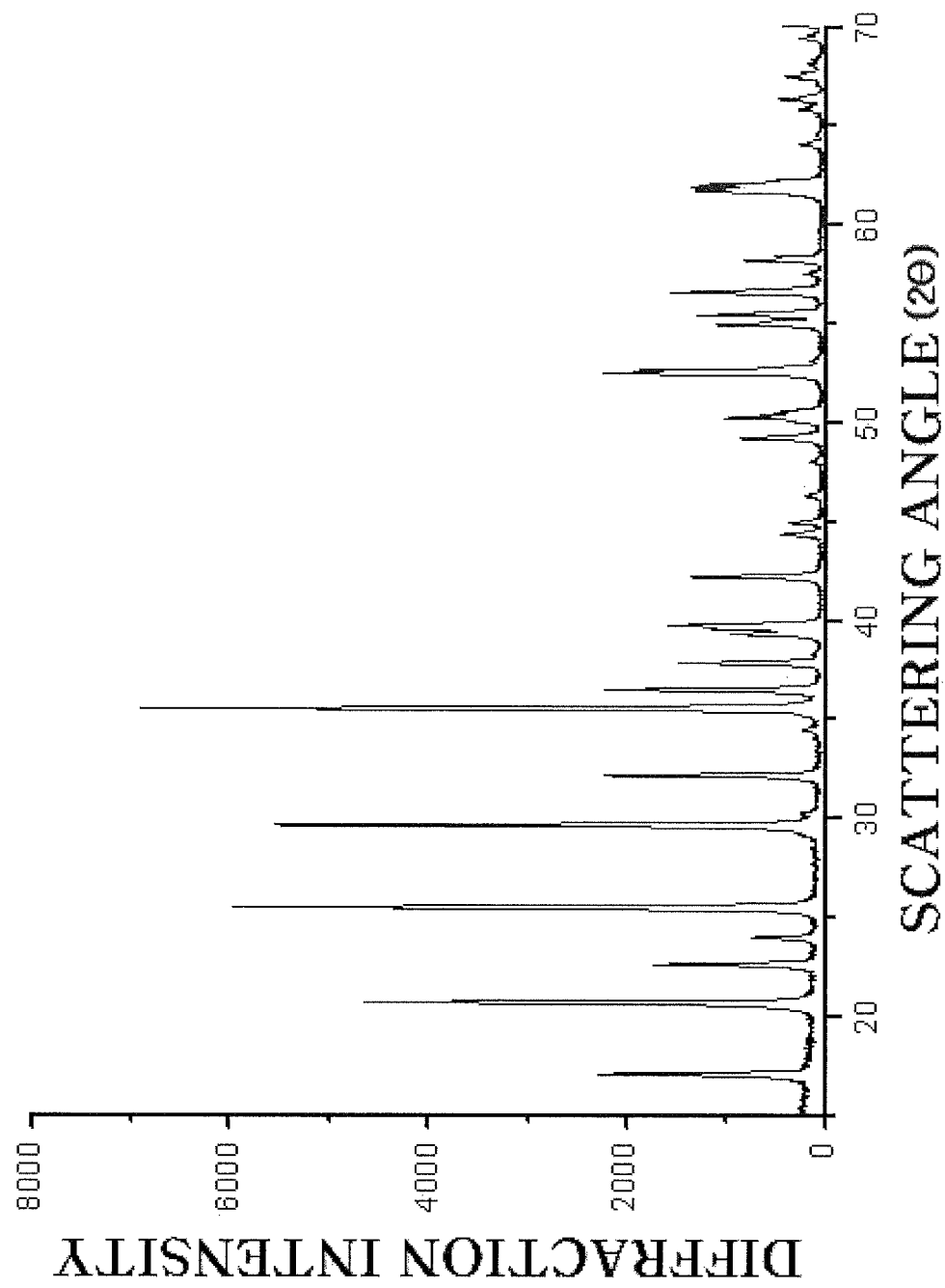
FIG. 10 is a diffraction pattern obtained by observing a lithium chrome iron phosphor oxide prepared from a chrome-doped crystalline iron phosphate according to the exemplary embodiment of the present invention by the XRD.
Figure 11:
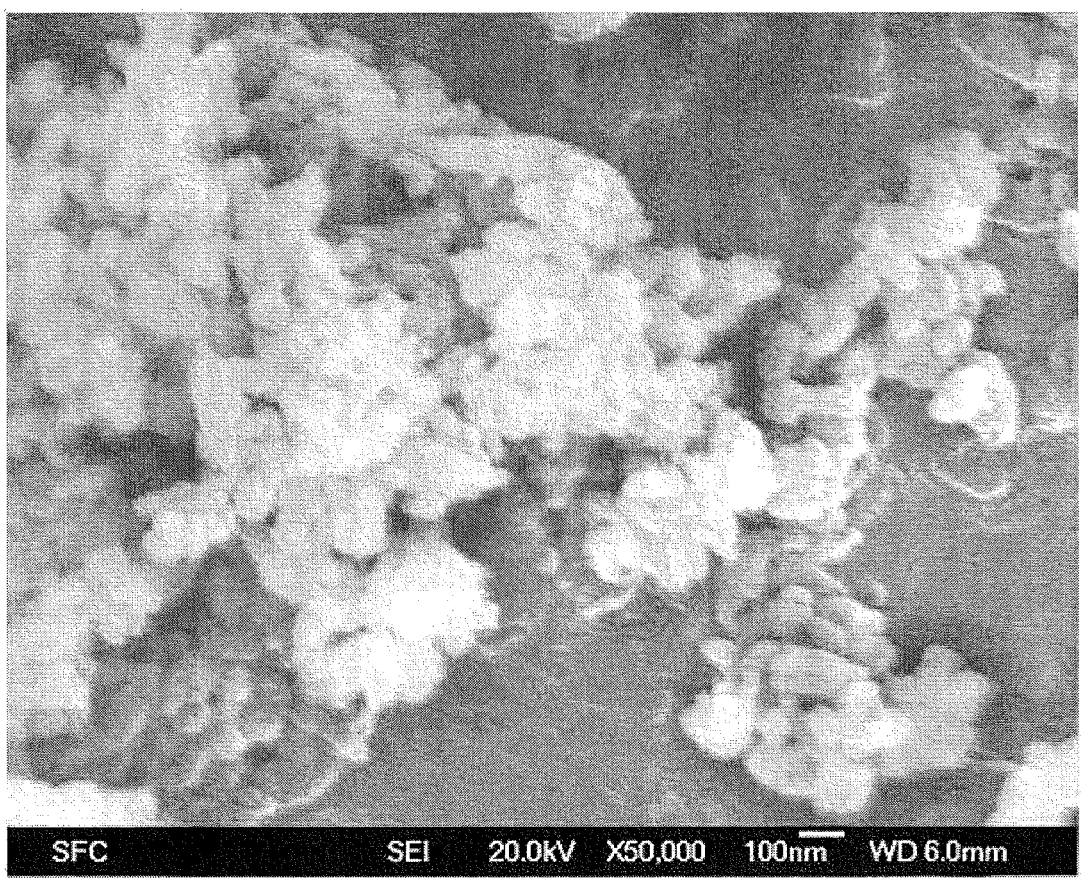
FIG. 11 is an image obtained by photographing the lithium chrome iron phosphor oxide prepared from the chrome-doped crystalline iron phosphate according to the exemplary embodiment of the present invention by the SEM.
Figure 12:
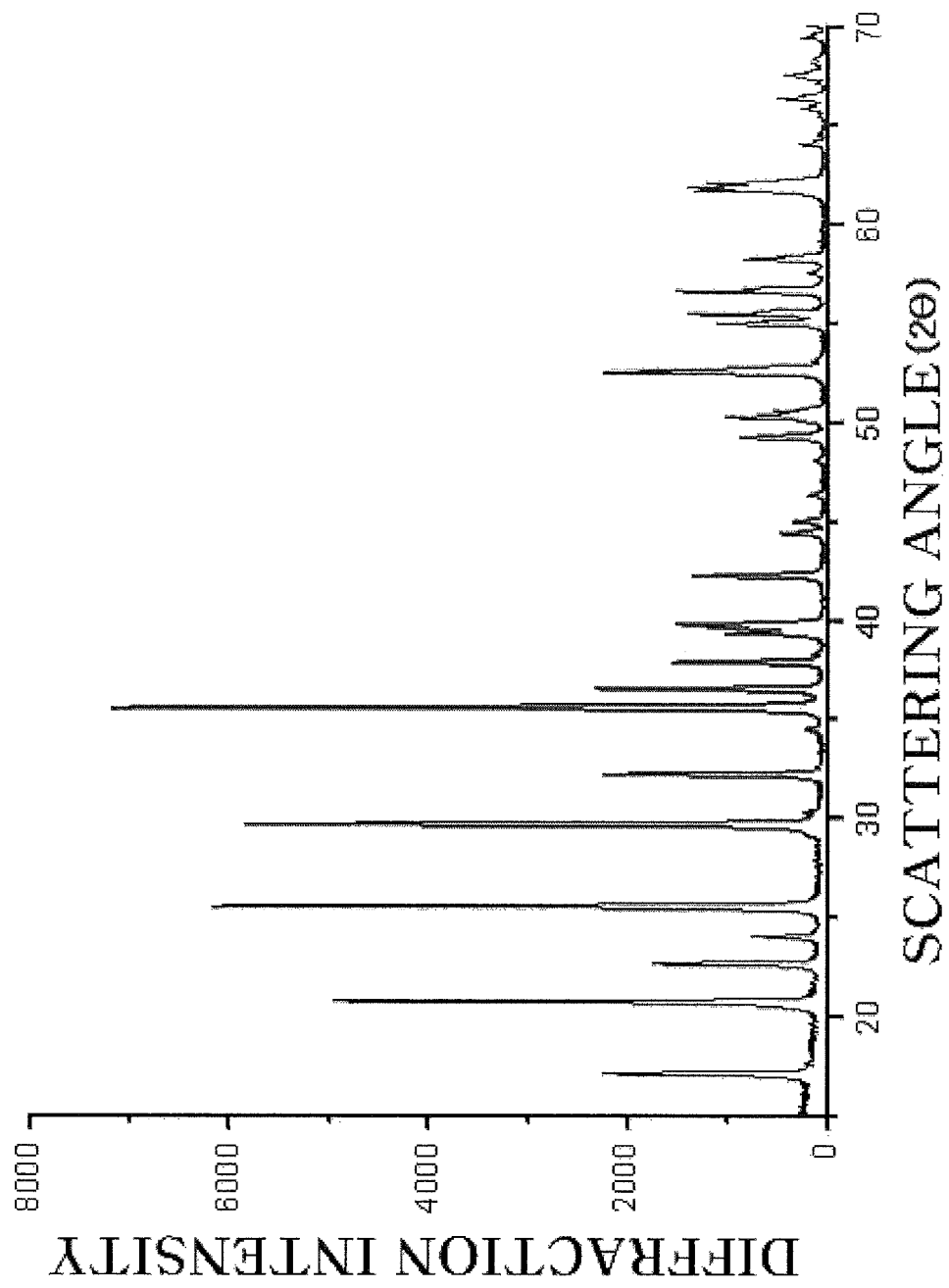
FIG. 12 is a diffraction pattern obtained by observing a lithium aluminum iron phosphor oxide prepared from an aluminum-doped crystalline iron phosphate according to the exemplary embodiment of the present invention by the XRD.
Figure 13:
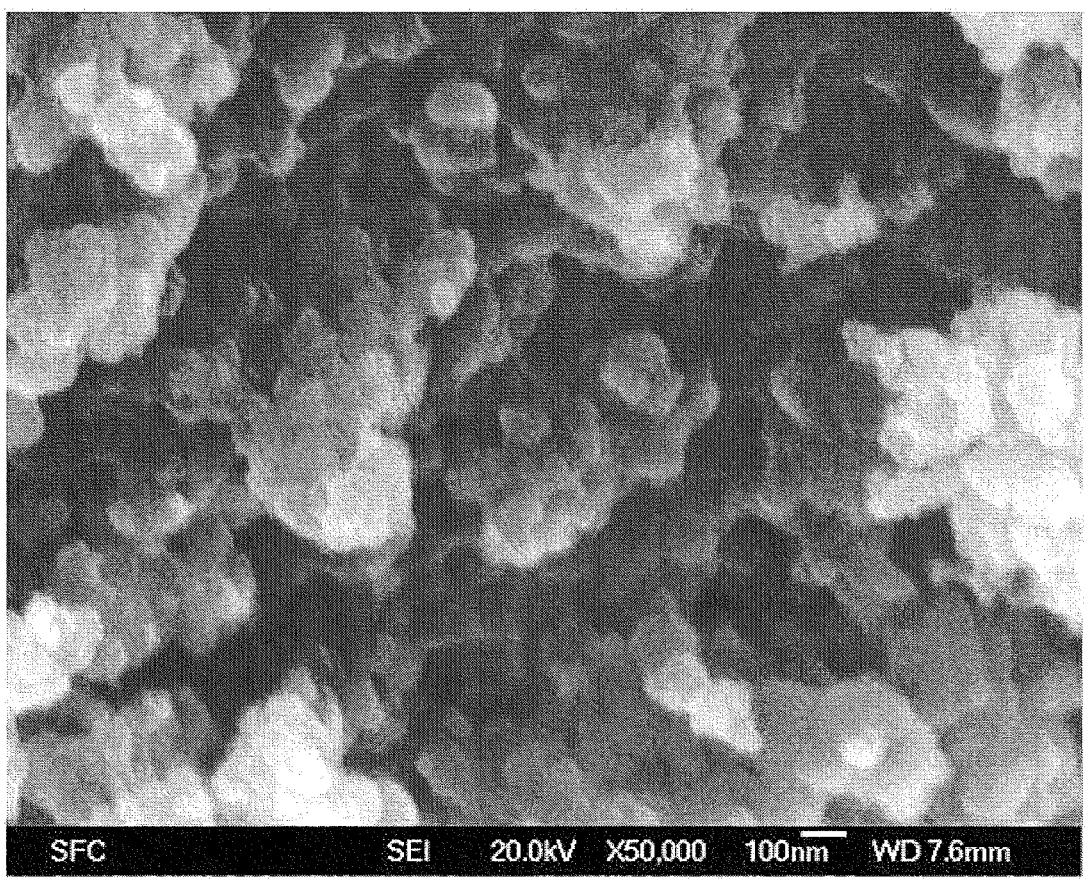
FIG. 13 is an image obtained by photographing the lithium aluminum iron phosphor oxide prepared from the aluminum-doped crystalline iron phosphate according to the exemplary embodiment of the present invention by the SEM.

The XRD diffraction pattern and SEM observation results of the crystalline iron phosphate used as the raw material in Example 1 and the lithium iron phosphor oxide prepared therefrom are illustrated in FIGS. 4 and 5.

Specifications and analysis conditions of the used XRD and SEM are as follows.

XRD: analyzed by D/Max-2500VK/PC manufactured by Rikagu Cooperation
  (Analysis condition: CuKa radiation, speed 4° $min^{-1}$)

SEM: Photographed by JSM-7400F manufactured by JEOL Ltd. (Analysis condition: 20 kV)

FIG. 4 is an XRD diffraction pattern of the lithium iron phosphate prepared by the method of the present invention, and it could be confirmed that the nano-particles thereof had the crystalline olivine structure.

Further, it could be seen that the particles thereof had the nano-size by the particle shape of the crystalline lithium iron phosphate observed by the SEM of FIG. 4.

Evaluation Example

The discharge capacity of each of the lithium iron phosphor oxide prepared according to Example 1 of the present invention and the lithium iron phosphor oxides prepared according to Comparative Examples 1 and 2 was evaluated, and the result is described in the following Table 1.

The lithium iron phosphor oxide prepared in Example 1 and the lithium iron phosphor oxides prepared in Comparative Examples 1 and 2 were used as the carbon black, the active material, the conductor (carbon black), and the binder (PVdf) were put into the NMP (N-methylpyrrolidone) solvent so that the ratio of active material:conductor:binder was 85:5:10 wt %, and mixing was performed to prepare the slurry. Subsequently, the aluminum plate was laid on the glass plate disinfected by alcohol or acetone, and the mixed slurry was uniformly applied thereon by the doctor blade in a thickness of 20 to 25 μm. Drying was performed in the oven (about 90 to 100° C.) for 8 hours to remove the solvent. Subsequently, the pressure was applied by using the press machine to obtain the thickness of 50 to 70 μm suitable for the anode plate, and punching was performed so as to meet the coin cell standard, thus preparing the anode plate. Subsequently, the lithium metal was bonded to the polar plate in the globe box filled with the inert gas to prepare the cathode plate. The lithium cathode plate was put in the lower case of the coin cell, and the isolation membrane (manufactured by Celgard, LLC, Celgard 2300, thickness: 25 μm), the electrolyte (1.3M $LiPF_6$ of EC/EMC=3/7), the anode plate, and the upper case were sequentially put, and assembled to prepare the coin cell. The discharge capacity was evaluated by using the charging and discharging tester (Toyo, T475-HR), and the result is described in Table 1.

TABLE 1

| C-rate | Example 1 | Comparative Example 1 | Comparative Example 2 |
| --- | --- | --- | --- |
| FM (initial capacity) | 172.7 mAh/g | 158.6 mAh/g | 133.7 mAh/g |
| 0.1 C | 172.7 mAh/g | 158.8 mAh/g | 135.8 mAh/g |
| 0.5 C | 168.2 mAh/g | 151.5 mAh/g | 117.6 mAh/g |
| 1 C | 165.8 mAh/g | 147.6 mAh/g | 108.2 mAh/g |
| 3 C | 156 mAh/g | 137.8 mAh/g | 88.7 mAh/g |
| 5 C | 146.5 mAh/g | 129.8 mAh/g | 77.0 mAh/g |
| 7 C | 136.4 mAh/g | 120.5 mAh/g | 67.0 mAh/g |

As confirmed through the discharge capacity evaluation result of Table 1, it can be seen that the discharge capacity of the olivine structure-type lithium iron phosphor oxide prepared according to the present invention is more excellent as compared to the lithium iron phosphor oxide prepared by an existing method.

The present invention has been described with reference to the exemplary embodiments in an illustrative manner, and a person with ordinary skill in the art will understand that many modifications and other equivalent exemplary embodiments of the present invention are possible in light of the above teachings. Accordingly, the true technical protection scope of the present invention should be determined by the technical spirit of the appended claims.

The invention claimed is:

1. A method for preparing a lithium metal phosphor oxide, the method comprising:
  introducing an iron salt solution and a phosphate solution through separate inflow paths into a reactor, the reactor including a chamber into which the inflow paths ultimately flow and a distributor, the chamber containing an agitator in a form of a rotatable packed bed on a vertically positioned rotation shaft, the packed bed having a cylindrical shape and including one mesh layer, the distributor existing at a central portion in a cylinder of the packed bed, and the iron salt solution and the phosphate solution are supplied to an internal surface of the packed bed through the distributor;
  mixing the iron salt solution and the phosphate solution to form a mixed solution in the reactor;
  applying a shearing force to the mixed solution in the reactor during the mixing, applying the shearing force including agitating the mixed solution by the agitator, whereby a flow condition having a Reynolds number of 8,000 to 100,000 is formed in the distributor of the reactor to form a suspension containing nano-sized iron phosphate precipitate particles;
  optionally doping a dissimilar metal into the nano-sized iron phosphate precipitate particles, the dissimilar metal being selected from the group consisting of Ni, Co, Mn, Cr, Zr, Nb, Cu, V, Ti, Zn, Al, Ga, and Mg,
  obtaining nano-sized iron phosphate particles from the suspension; and
  mixing the nano-sized iron phosphate particles with a lithium raw material and performing firing to form the lithium metal phosphor oxide such that the lithium metal phosphor oxide has the following Equation I $$LiM_nFePO_4 \qquad \text{Equation I}$$

where M is selected from the group consisting of Ni, Co, Mn, Cr, Zr, Nb, Cu, V, Ti, Zn, Al, Ga, and Mg, and n is in a range of 0 to 1.

2. The method of claim 1, wherein the iron salt solution includes one kind or more selected from the group consisting of an iron (III) acetate salt, an iron (III) halide salt, an iron (III) nitrate salt, an iron (III) sulfate salt, and a hydrate and a mixture thereof.

3. The method of claim 1, wherein the iron salt solution includes one kind or more selected from the group consisting of an iron (II) acetate salt, an iron (II) halide salt, an iron (II) nitrate salt, an iron (II) sulfate salt, iron (II) hydroxide, and a hydrate and a mixture thereof.

4. The method of claim 1, wherein the applying of the shearing force is performed under a condition where at least one of nano-sized amorphous iron phosphate and crystalline iron phosphate particles is formed.

5. The method of claim 1, wherein the nano-sized iron phosphate particles have a narrow particle size distribution having a steepness of less than 3.

6. The method of claim 1, wherein mixing of the iron salt solution and the phosphate solution is performed under a condition where intermediate iron phosphate species are not formed.

7. The method of claim 1, wherein the nano-sized iron phosphate particles are amorphous.

8. The method of claim 7, further comprising: aging the suspension under a condition where crystalline iron phosphate particles are formed.

9. The method of claim 7, further comprising: aging the nano-sized amorphous iron phosphate particles.

10. The method of claim 9, further comprising: applying a shearing force to a mixture containing the nano-sized amorphous iron phosphate particles and adjusting the shearing force and a condition in the mixture to form crystalline nano-sized iron phosphate particles, during the aging.

11. The method of claim 10, further comprising: isolating the crystalline iron phosphate particles from the mixture containing the nano-sized iron phosphate particles; and drying the crystalline iron phosphate particles to form a crystalline iron phosphate powder.

12. The method of claim 10, further including doping the dissimilar metal while forming the crystalline nano-sized iron phosphate particles, to form a metal-doped crystalline iron phosphate having the following Equation: $MFePO_4$ where M is selected from the group consisting of Ni, Co, Mn, Cr, Zr, Nb, Cu, V, Ti, Zn, Al, Ga, and Mg.

13. The method of claim 12, wherein a molar ratio of [Fe] and [M] is 1-x:x, and herein, x is 0.01 to 0.05.

14. The method of claim 1, wherein a firing temperature is 500° C. to 700° C.

15. The method of claim 1, wherein one kind or more selected from the group consisting of LiOH, $Li_2CO_3$, and LiCl are included as the lithium raw material.

16. The method of claim 10, wherein the crystalline iron phosphate and the lithium raw material are mixed such that a molar ratio of the crystalline iron phosphate to the lithium raw material is 1:0.5 to 1.5.

17. The method of claim 11, wherein mixing the nano-sized iron phosphate particles with the lithium raw material includes mixing the crystalline iron phosphate with the lithium raw material wherein in the mixing of the crystalline iron phosphate and the lithium raw material, a carbon-coated raw material selected from sucrose or glucose is further included.

18. The method of claim 12, wherein the metal-doped crystalline iron phosphate and the lithium raw material are mixed such that a molar ratio of doped crystalline iron phosphate to the lithium raw material is 1:0.5 to 1.5.

19. The method of claim 12, wherein mixing the nano-sized iron phosphate particles with the lithium raw material includes mixing the metal-doped crystalline iron phosphate with the lithium raw material wherein in the mixing of the metal-doped crystalline iron phosphate and the lithium raw material, a carbon-coated raw material selected from sucrose or glucose is further included.

* * * * *